L. H. PERLMAN.
WHEEL.
APPLICATION FILED SEPT. 23, 1916.

1,324,320. Patented Dec. 9, 1919.

Witnesses
A. H. Lybrand
C. H. Fesler

Inventor
Louis H. Perlman,
By Edgar M. Kitchin,
his Attorney.

UNITED STATES PATENT OFFICE.

LOUIS H. PERLMAN, OF NEW YORK, N. Y.

WHEEL.

1,324,320.     Specification of Letters Patent.     Patented Dec. 9, 1919.

Application filed September 23, 1916. Serial No. 121,832.

*To all whom it may concern:*

Be it known that I, LOUIS H. PERLMAN, a citizen of the United States, residing at New York city, in the county of New York and State of New York, have invented certain new and useful Improvements in Wheels; and I do hereby declare the following to be a full, clear, and exact description of the invention, such as will enable others skilled in the art to which it appertains to make and use the same.

This invention relates to improvements in vehicle wheels of the type especially adapted for use on automobiles, and more particularly relates to that type of wheel structure which has come to be known as a cross-cut demountable.

The object in view is the provision of simple and efficient means for retaining the ends of the rim in proper operative relation with respect to each other and with respect to the wheel body.

With this and further objects in view as will in part hereinafter become apparent and in part be stated, the invention comprises certain novel constructions, combinations and arrangements of parts as subsequently specified and claimed.

In the accompanying drawing,—

Figure 1:
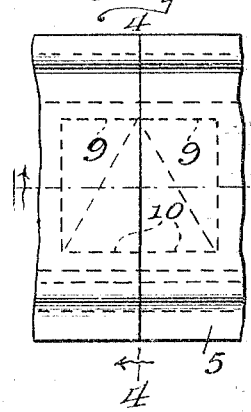
Figure 1 is a fragmentary plan view of a demountable rim embodying the features of the present invention, the rim end locking means being seen in dotted lines.
Figure 2:
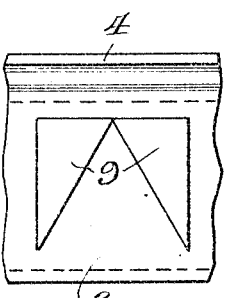
Fig. 2 is a similar view of a fragment of a wheel body with the demountable rim removed.

Referring to the drawing by numerals, 1 indicates the spokes, and 2 the wood felly band of the usual wheel body. A felly band or fixed rim 3 of the usual type is mounted on the felly band 2 and at its inner edge is provided with the usual stop flange 4.

Mounted on the wheel body is the demountable rim 5 which is of the channel cross cut type. The rim 5 rests at its inner edge against the stop flange 4 and is locked in its operative position by the usual side wedges, or like locking means 7, appropriately spaced about the wheel. Such wedges are commonly employed in this art to exert an inclined pressure on the rim 5 in a direction for seating the rim axially against the flange 4 and at the same time pressing the rim radially outward in a direction away from the wheel body. The said wedges thus tend to expand the rim 5, and to consequently pull the ends of the rim apart.

It is one of the objects of this invention to lock the rim against separation at the cross cut, and to this end the rim 5 is provided with a triangular plate 10 at each end, the said plates being so shaped and positioned with respect to each other that when the ends of the rim are in their operative position the two plates together form a V-shaped structure with the apex of the V presented axially inward. These plates may be provided on the rim in any appropriate manner, as by riveting or spot welding, or by being stamped from the material of the rim itself.

Coöperating with the plates 10 are wedge blocks 9, 9 carried by the felly band 3 and connected therewith in any appropriate manner, the same as plates 10. The wedge blocks 9 are approximately triangular in shape and are arranged with their inclined faces so disposed as to provide an axially outwardly-opening substantially V-shaped pocket or recess into which the V-shaped structure formed of the two plates 10 is adapted to extend.

Thus, in operation, when the side wedges force the rim 5 over to its final operative position on the wheel body the V-shaped structure formed of plates 10 is forced between the blocks 9, and the inclined faces of the respective contacting parts tend to draw the ends of the rim together and thus effectively counteract the tendency on the part of the rim to expand incident to the action of its locking wedges. The operation of the demountable rim 5 is the same as that of any ordinary cross cut demountable rim with the exception of the action of plates 10 and blocks 9 as above specified, the said plates and blocks serving also as drivers for the rim.

For the purpose of clearness of expression it is pointed out that in the wheel structure there are two directions which may be considered inward, and consequently two directions which may be considered outward. One inward direction is toward the car on which the wheel is mounted and that direction is axially inward. The other direction inward is toward the axis of the wheel and that is referred to herein as radially inward.

Figure 5:
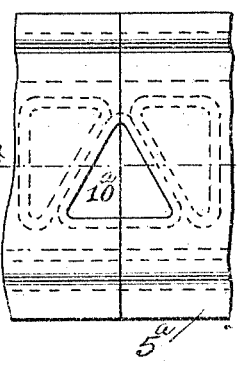
Figs. 5, 6, 7 and 8 are views, respectively, corresponding to Figs. 1, 2, 3 and 4 of a modified embodiment of the invention.
Figure 6:
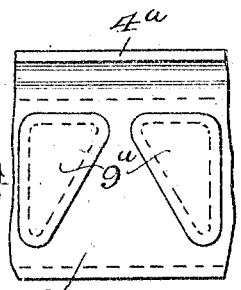
Figure 3:
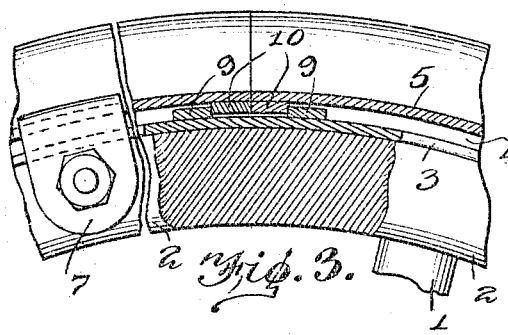
Fig. 3 is a view partly in side elevation and partly in transverse axial section of a fragment of the wheel body and demountable rim assembled.
Figure 7:
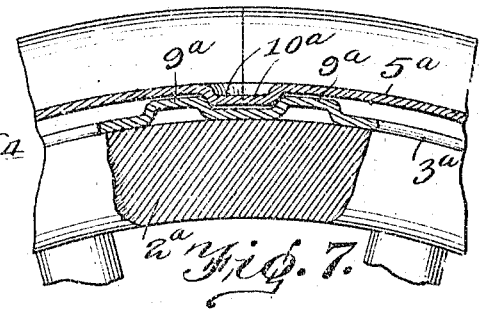
Figure 4:
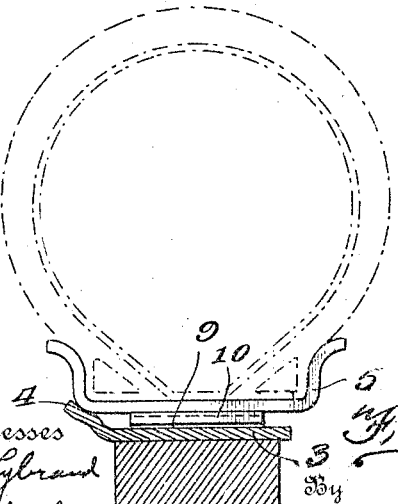
Fig. 4 is a transverse section taken on the plane indicated by line 4—4 of Fig. 1.
Figure 8:
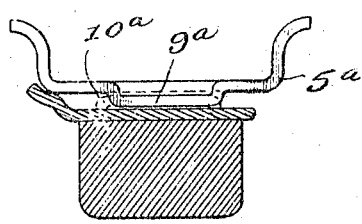

In Figs. 5 to 8 inclusive are seen a slightly modified embodiment which for the purpose of interpretation of the appended claims may be considered the preferred embodiment. In this structure the parts are identical with those above disclosed except that instead of the plates 10ᵃ seen therein, and corresponding to plates 10 being formed of separate material and secured to the rim, the said plates are stamped directly from the material of the demountable rim 5ᵃ. Plates 9ᵃ in this embodiment likewise corresponding to plates 9 are similarly stamped from the felly band 3ᵃ. The operation of the structure is the same as that above described.

What I claim is:—

1. The combination with a wheel body, of a felly band thereon having stamped plates provided with axially inclined edges presenting an axially inwardly tapering recess, a demountable rim for the wheel body having a radially inwardly stamped structure of substantially V shape form with the apex of the V pointing axially inward, and means for locking the demountable rim on the wheel body.

2. The combination with a wheel body, of a felly band thereon having stamped plates provided with axially inclined edges presenting an axially inwardly tapering recess, a demountable rim for the wheel body having a radially inwardly stamped structure of substantially V shape form with the apex of the V pointing axially inward, and means for locking the demountable rim on the wheel body, the demountable rim being cross cut across the said V-shaped structure.

3. The combination with a wheel body, of a felly band therein having stamped plates provided with axially inclined edges presenting an axially inwardly tapering recess, a demountable rim for the wheel body having a radially inwardly stamped structure of substantially V shape form with the apex of the V pointing axially inward, and means for locking the demountable rim on the wheel body.

In testimony whereof I affix my signature in presence of two witnesses.

LOUIS H. PERLMAN.

Witnesses:
I. B. LEIBSON,
C. W. MOTT.